3,486,926
METHOD OF PRODUCING REFLECTIVE MARKERS AND THE RESULTING MARKER
Donald C. Rideout and Luke M. Shuler, Huntingdon, and William H. Riley, Jr., Altoona, Pa., assignors to Prismo Safety Corporation, Huntingdon, Pa., a corporation of Pennsylvania
No Drawing. Filed Dec. 2, 1966, Ser. No. 598,628
Int. Cl. B44d 1/20, 1/098
U.S. Cl. 117—104                                                  8 Claims

ABSTRACT OF THE DISCLOSURE

A method of providing a thin, transparent coating of constant thickness not exceeding 0.2 mil covering the face of an exposed lens type marker by air spraying a resin composition of less than 20% resin plus 80% or more of a solvent having an effective relative evaporation rate of between 43–100 relative to butyl acetate as 100, the air spraying being conducted at a high air to fluid ratio.

---

This invention relates to reflective signs and markers and more particularly to reflective signs and markers that are resistant to the elements with greater reflectivity, and to the compositions and methods for making them.

Most reflective signs are of the exposed lens type. The exposed lens type signs are usually made by dropping glass spheres onto a tacky pigmented binder layer and permitting the binder layer to cure. The glass spheres may be reflectively coated with a reflective metal and after curing of the binder layer, the exposed reflective metal coating is removed, leaving the reflective coating only on the underside or embedded side of the glass spheres. These signs are relatively inexpensive, give good night time reflection, can be made with a minimum of equipment by the user and can be applied to irregular as well as flat surfaces. This type of sign has a number of disadvantages, however. For example, the sign has poor water resistance, tends to pick up and retain dirt particles, has poor color characteristics, both daytime and night time and is highly susceptible to weathering. Further, the exposed surface of the reflective metal tends to react with the elements present in the atmosphere to darken, thereby causing an objectionable daytime darkening of the sign and eventually affecting the night time reflectivity.

It has been found that these disadvantages can be at least partially eliminated by providing a thin protective top coating applied over the entire surface of the reflector uniformly covering both the glass spheres and the valleys between the spheres evenly. The coating layer will adversely affect the reflectivity of the spheres. Accordingly, the top coating must be kept very thin, so that the spherical radius of the sphere is increased only by a negligible amount from that of the uncoated sphere. This thin transparent top coating, which may be colorless, will be primarily protective and will not substantially affect the optical characteristics of the sign. The transparent top coating may also be colored and will then also serve as an optical filter to color the reflected light.

In certain exposed lens type signs a message is silk screened or sprayed over a suitable mark thereon and when dried forms a thin colored film on the spheres which is not so thick that it will materially change the point of focus of the major amount of light beyond the reflecting surface. Some of the colored coatings result in a smooth non-light diffusing surface upon drying and no further coatings are necessary. However, certain colored coatings in order to obtain the desired intensity of color must have a high concentration of pigment therein thus resulting in a light diffusing surface when dry. It has been found that the application of a thin uniform thickness transparent coating in accordance with the present invention will develop the required no-light diffusing surface and will not appreciably affect the optical properties of the sign. Such a sign will thus have the thin transparent coating over the entire surface of the sign, both over the colored portions as well as the previously uncoated portions.

It is very difficult to spray a composition onto the face of a reflector having partially exposed glass spheres thereon, whether coated or uncoated, which is sufficiently thin and will form an even coating when dried which is concentric to the exposed portions of the spheres and also fills the valleys between the spheres with a constant thickness coating.

It is accordingly an object of the present invention to provide an improved reflective marker having a thin transparent coating of constant thickness not exceeding 0.2 mil completely coating the reflective elements and the spaces therebetween.

It is a further object of the present invention to provide a method of making improved exposed lens type reflective signs having a thin transparent coating of constant thickness not exceeding 0.2 mil completely coating the outer surface of the sign.

Other objects and the nature and advantages of the instant invention will be apparent from the following description.

Exposed lens type reflectors comprise in general a backing sheet which may be of wood, metal or the like having a layer of pigmented binder thereon in which a plurality of small glass spheres are partially embedded. The binder layer may be white or colored and the daylight color from the binder is primarily reflected from the interstices between the glass spheres. At night the light is reflected from the reflective binder beneath the spheres or from the reflective metal coating on the embedded portion of the glass spheres.

In such reflectors, glass spheres with a refractive index in the range of 1.90–1.95 have been found preferable both for the reflective metal coated and uncoated spheres. The non-reflectively coated spheres may, however, be glass spheres having a refractive index in the range of 1.5–1.7. The preferred size of the glass spheres is in the range of 0.0058–0.0065 inch average diameter, the spheres being screen graded if necessary so as to avoid an undue variation in size. The spheres may be slightly smaller or larger than this, but best results and uniformity of appearance are realized when using spheres of relatively uniform size not varying by more than 1 mil in diameter.

For certain purposes, a mixture of reflective metal coated and uncoated glass spheres may be utilized in the marker. When such a mixture of glass spheres is used in a colored reflective sign, the proportion of the reflective metal coated spheres can be varied between 25–100% and the uncoated spheres between 0–75%. For a white sign, which utilizes a clear unpigmented protective coating, at least 25% of the uncoated spheres are used for best daylight appearance and at least 25% of the metal coated spheres are used for best night time reflection. Thus, for both good daylight and night time appearance, in a white sign the proportion of metal coated spheres is maintained between 25–75% and the proportion of clear spheres is maintained between 25–75%.

The mixture of reflectively coated and uncoated spheres can be applied to a pigmented binder while it is still tacky. After the binder has set up and hardened, the spheres are retained partially embedded therein. The exposed reflective coating on the spheres is next removed by washing with nitric acid or other solvent therefor, or by use of abrasive, etc., to yield reflectively backed spheres along with the uncoated spheres.

The reflector is now ready for further processing to apply a message in a color if desired and for application of the thin protective top coating in accordance with this invention.

The top coating composition utilized in accordance with this invention comprises a combination of resins and of solvents of particular characteristics which results in a transparent composition having just enough flow to form the desired thin uniform coating over the contour of the irregular surface of the open lens signs without flowing from the tops of the exposed spheres into the interstices between the spheres and accumulating therein. Further, the method of application of this coating must be controlled as described hereafter to yield the desried thickness of coating which should not exceed 0.2 mils.

The general formula for the top coating is:

|  | Percent by wt. |
|---|---|
| Solid resin | 0.25–20 |
| Solvent | 80–99.75 |

The resins that can be used can be any resins or combinations of a group which are commonly used for coating substrates that are to have exterior exposure. Examples are:

alkyd resins
acrylic esters
polyvinyl chloride
polyvinyl chloride-acetate copolymers
cellulose acetate butyrate
alkyd-melamine
polysiloxane
urea-formaldehyde
melamine formaldehyde Critical features in the invention are to obtain the proper flow of the composition and the method of application so as to obtain a relatively constant thickness yet an extremely thin coating on the sign. It has now been discovered that a critical feature in obtaining this result is the use of a solvent or combination of solvents in the coating composition which have a relative evaporation rate of between 43–100. The relative evaporation rate is determined by direct comparison with butyl acetate with the evaporation time of butyl acetate rated as 100.

The following is a list of solvents which have evaporation rates between 43–100:

| Butyl acetate | 100 |
|---|---|
| Ethyl butyl ketone | 45 |
| Mesityl oxide | 94 |
| Methyl amyl acetate | 47 |
| Xylene | 70 |
| Methyl Cellosolve | 47 |
| Methyl isoamyl ketone | 45 |
| Methoxy propanol mixed isomer | 50 |
| Butanol | 45 |
| Isobutanol | 72 |

Of course, combinations of these solvents and/or other solvents can be used so long as the resulting composition when it strikes the surface to be coated has the viscosity characteristics which will yield a uniform thickness of coating over the irregular surface. A combination of a fast solvent which has a relative evaporation rate greater than 100 with a slow solvent which has a relative evaporation rate less than 43 can be used so long as proportions are such that the viscosity of the composition when it reaches the surface to be coated will yield a uniform thickness of coating.

When more than one solvent is used the resulting combination of solvents must have an effective relative evaporation rate of between 43 and 100. The term "effective relative evaporation rate of between 43 and 100" when used in the claims is meant to include (a) a combination of solvents of which at least 85% of the solvents present have a relative evaporation rate of between 43 and 100; (b) a combination of at least one solvent having a relative evaporation rate of between 43 and 100 in combination with at least one solvent having an evaporation rate greater than 100 and at least one solvent having an evaporation rate less than 43 wherein the slower solvent acts to compensate for the faster solvent; and (c) a combination of at least one solvent having an evaporation rate greater than 100 and at least one solvent having an evaporation rate less than 43, wherein the slower solvent acts to compensate for the faster solvent.

The following are solvents having evaporation rates less than 43 and greater than 100 that can be used in the present invention:

| Amyl acetate | 42 |
|---|---|
| Butyl carbitol | <1 |
| Butyl carbitol acetate | <1 |
| Butyl Cellosolve | 6 |
| Butyl Cellosolve acetate | 3 |
| Butyl lactate | 3 |
| Carbitol acetate | <1 |
| Ethyl lactate | 22 |
| Isophorone | 3 |
| Methyl carbitol | <1 |
| Methyl Cellosolve acetate | 31 |
| Primary amyl alcohol | 26 |
| Acetone | 1160 |
| 2-butylacetate | 186 |
| Ethyl acetate (85–90%) | 615 |
| Ethyl ether | 3300 |
| Isobutyl acetate | 145 |
| Isopropyl acetate | 500 |
| Isopropyl ether | 842 |
| Methanol | 610 |
| Methyl acetate (82%) | 1180 |
| Benzene | 630 |
| Ethyl amyl ketone | 25 |
| Cellosolve acetate | 21 |
| Cyclohexanone | 23 |
| Diacetone alcohol | 14 |
| Diethyl carbitol | 4 |
| Diisobutyl ketone | 18 |
| 2-ethylhexyl acetate | 3 |
| Cyclohexanol | 8 |
| 1-hexanol | 5 |
| Methyl amyl alcohol | 33 |
| 97% aromatic solvent (IBP, 311° F.; dry point 344° F.) (Solvesso 150) | <10 |
|    C9 aromatics percent | 1.2 |
|    C10 aromatics do | 54.3 |
|    C11 aromatics do | 18.5 |
|    C12 aromatics do | 1.8 |
|    Indenes do | 16.0 |
|    Naphthalenes do | 5.2 |
|    Non-aromatics do | 3.0 |
| Toluene | 240 |
| Methyl acetone | 1050 |
| Methyl ethyl ketone | 570 |
| Methyl isobutyl ketone | 165 |
| Methyl propyl ketone | 250 |
| Propyl acetate | 275 |
| Tetrahydrofuran | 800 |
| 2-butanol | 120 |
| Ethanol (95%) | 230 |
| Isopropanol | 230 |
| 1-propanol | 110 |

The following are non-limiting specific examples of formulations which can be used as the transparent top coating:

EXAMPLE 1

|  | Percent by weight |
|---|---|
| 80% methyl methacrylate; 20% ethylacrylate copolymer | 8 |
| Xylene | 20 |
| Ethyl butyl ketone | 72 |

Both solvents used herein have relative evaporation rates between 43 and 100. The formulation has a total solids content of 8%.

EXAMPLE 2

| | Percent by weight |
|---|---|
| 80% methyl methacrylate, 20% ethylacrylate copolymer | 6.0 |
| Urea-formaldehyde resin | 0.7 |
| Polysiloxane | 0.9 |
| Ethyl butyl ketone | 83.3 |
| Toluol | 9.1 |

EXAMPLE 3

| | Percent by weight |
|---|---|
| 80% methyl methacrylate, 20% ethylacrylate copolymer | 5.5 |
| Urea-formaldehyde resin | 0.8 |
| Aryl sulfonamide-formaldehyde copolymer | 0.4 |
| 91% vinylchloride-3% vinylacetate-6% vinyl alcohol copolymer | 1.2 |
| Xylene | 23.7 |
| Ethyl butyl ketone | 23.7 |
| Methyl isobutyl ketone | 44.3 |
| 2,2' dihydroxy 4,4' dimethoxy-benzophenone (ultra violet stabilizer) | 0.4 |

This formulation has a total solids content of 8.27% by weight (5.87% by volume).

EXAMPLE 4

| | Percent by weight |
|---|---|
| 80% methyl methacrylate-20% ethylacrylate copolymer | 6.2 |
| Urea-formaldehyde resin | 0.7 |
| Polysiloxane resin | 0.9 |
| Xylene | 23.6 |
| Methylisobutyl ketone | 42.9 |
| Isophorone | 25.7 |

EXAMPLE 5

| | Percent by weight |
|---|---|
| 80% methylmethacrylate—20% ethylacrylate copolymer | 6.0 |
| Urea-formaldehyde resin | 0.7 |
| Polysiloxane resin | 0.9 |
| Xylene | 22.9 |
| Methylisobutyl ketone | 41.5 |
| Methyl carbitol (diethylene glycol monomethyl ether) | 28.0 |

EXAMPLE 6

| | Percent by weight |
|---|---|
| 80% methyl methacrylate—20% ethylacrylate copolymer | 6.3 |
| Urea-formaldehyde resin | 0.7 |
| Polysiloxane resin | 0.9 |
| Xylene | 23.8 |
| Methylisobutyl ketone | 43.2 |
| 97% Aromatic solvent (IBP 370° F.-dry point 410° F.) (Solvesso 150) | 25.1 |

EXAMPLE 7

| | Percent by weight |
|---|---|
| 80% methyl methacrylate—20% ethylacrylate copolymer | 17.5 |
| Polysiloxane | 2.1 |
| Xylene | 1.4 |
| Toluol | 26.3 |
| 97% Aromatic solvent (IBP 311° F.-dry point 344° F.) (Solvesso 150) | 52.7 |

This formulation has a total solids content of 19.6%.

In addition to the use of the proper composition of the top coating, there are other critical features involved in the process of application of the compositions so that a uniform coating may be obtained of a thickness which should not exceed 0.2 mil.

When spraying the composition, an air spray gun should be used, and the air to fluid ratio must be closely controlled to yield about 1.20–1.30 cu. ft. of air/sq. ft. of sign surface with about 0.6–0.8 oz. of fluid/sq. ft. of sign surface. The temperature and humidity conditions must also be controlled during spraying so that the temperature is not less than about 70° F. and not greater than about 95° F., whereas the humidity must be over 20% relative humidity for the above spraying conditions.

In a specific example of a method for spraying a sign according to the present invention, the composition of Example 3 was utilized. The composition was sprayed at a rate of 6.5 oz./min. using air at a pressure of 35# at the rate of 12 cu. ft./min. from a Binks 21 spray gun having an opening of 0.028" diameter at the nozzle. The nozzle tip was mounted about 9" above the surface of the sign to be sprayed. The sign was located on a conveyor moving forward at a speed of about 42"/min. The nozzle traversed over this sign at a speed of 26 cycles/min.

The resulting sign was found to have a relatively uniform thickness of dry top coating of slightly less than 0.2 mil average.

The sign sprayed with this protective top coating can be a white exposed lens type sign with or without a thin coating of a transparent colored material to define a message thereon.

The resulting sign was found to have excellent retroreflectivity at night even in wet weather and an extremely good daylight appearance, highly resistant to darking after exposure to atmospheric gases and with good mechanical stability.

What is claimed is:

1. A method of applying a constant thickness transparent top coating onto the surface of an exposed lens type marker which comprises air spraying a composition onto the surface of said marker, said composition comprising 0.25–20% by weight of resin in combination with 80–99.75% by weight of solvent having an effective relative evaporation rate of between 43 and 100 based on the evaporation rate of butyl acetate being 100, said air spraying being conducted at a high air to fluid ratio of about 1.2–1.3 cu. ft. of air/sq. ft. of sign surface with about 0.6–0.8 oz. of fluid/sq. ft. of sign surface at a temperature of about 70–95° F. and an ambient relative humidity greater than 20% so as to obtain a substantially uniform dry thickness of top coating of not greater than 0.2 mil.

2. A method according to claim 1 wherein the composition is sprayed with the spray nozzle approximately 9" above the surface of the marker.

3. A method according to claim 1 wherein the composition sprayed consists essential of:

| | Percent by weight |
|---|---|
| Methyl methacrylate-ethylacrylate copolymer | 5.5 |
| Urea formaldehyde resin | 0.8 |
| Aryl sulfonamide-formaldehyde copolymer | 0.4 |
| Vinyl chloride-vinylacetate-vinyl alcohol copolymer | 1.2 |
| Xylene | 23.7 |
| Ethyl butyl ketone | 23.7 |
| Methylisobutyl ketone | 44.3 |
| Ultra violet light stabilizer | 0.4 |

4. A method according to claim 1 wherein the solvent is a combination of solvents of which at least 85% thereof have a relative evaporation rate of between 43–100.

5. A method according to claim 1 wherein the solvent is a combination of at least one solvent having a relative evaporation rate of between 43–100 in combination with at least one solvent having an evaporation rate greater than 100 and at least one solvent having an evaporation rate less than 43 wherein the slower solvent acts to compensate for the faster solvent.

6. A method according to claim 1 wherein the solvent is a combination of at least one solvent having an evaporation rate greater than 100 and at least one solvent having an evaporation rate less than 43 wherein the slower solvent acts to compensate for the faster solvent to yield an effective evaporation rate of between 43 and 100.

7. The marker resulting from the process of claim 1.

8. The marker according to claim 7 wherein the marker sprayed according to claim 1 previously had a message in transparent color applied to at least a portion of the face thereof.

References Cited

UNITED STATES PATENTS

| | | | |
|---|---|---|---|
| 1,407,461 | 2/1922 | Epstein | 117—26 X |
| 2,143,946 | 1/1939 | Hunter | 117—26 X |
| 2,400,453 | 5/1946 | Bogin. | |
| 2,401,904 | 6/1946 | Buller | 106—236 X |
| 2,684,915 | 7/1954 | Tinsley | 117—104 X |
| 3,386,941 | 6/1968 | Kane | 117—104 X |

OTHER REFERENCES

Sanderson: "Paint, Oil and Chemical Review," 106–311, pp. 10–11, Jan. 26, 1933.

ALFRED L. LEAVITT, Primary Examiner

J. H. NEWSOME, Assistant Examiner

U.S. Cl. X.R.

106—311; 117—37, 161, 26, 25